United States Patent
Griepentrog et al.

(10) Patent No.: US 6,870,333 B2
(45) Date of Patent: Mar. 22, 2005

(54) METHOD FOR OPERATING ASYNCHRONOUS MOTORS AND CORRESPONDING DEVICE

(75) Inventors: Gerd Griepentrog, Gutenstetten (DE); Lynn Johnson, Verona, WI (US); Diethard Runggaldier, Stegaurach (DE)

(73) Assignee: Siemens Aktiengesellschaft, Munich (DE)

( * ) Notice: Subject to any disclaimer, the term of this patent is extended or adjusted under 35 U.S.C. 154(b) by 119 days.

(21) Appl. No.: 10/168,478

(22) PCT Filed: Dec. 13, 2000

(86) PCT No.: PCT/DE00/04444

§ 371 (c)(1),
(2), (4) Date: Nov. 8, 2002

(87) PCT Pub. No.: WO01/48908

PCT Pub. Date: Jul. 5, 2001

(65) Prior Publication Data

US 2003/0146722 A1 Aug. 7, 2003

(30) Foreign Application Priority Data

Dec. 23, 1999 (DE) .......................... 199 62 667

(51) Int. Cl.[7] .............................. H02P 1/22; H02P 1/40; H02P 3/20; H02P 5/00
(52) U.S. Cl. ........................ 318/257; 318/254; 318/268; 318/799; 318/800
(58) Field of Search ................................ 318/138, 254, 318/257, 439, 700, 727, 799–812, 268

(56) References Cited

U.S. PATENT DOCUMENTS

| 4,176,306 A | 11/1979 | Asano et al. |
|---|---|---|
| 4,461,985 A | 7/1984 | Stitt |
| 4,481,456 A | 11/1984 | Meyerand, Jr. et al. |
| 4,524,361 A | 6/1985 | Teulings |
| 4,791,341 A | 12/1988 | Brown et al. |
| 4,916,370 A * | 4/1990 | Rowan et al. ............... 318/368 |
| 4,978,897 A * | 12/1990 | Merrison et al. ........... 318/268 |
| 4,996,469 A * | 2/1991 | DeLange et al. ........... 318/757 |
| 5,187,419 A * | 2/1993 | DeLange ..................... 318/805 |
| 5,341,080 A * | 8/1994 | Agut Sanz .................. 318/778 |

FOREIGN PATENT DOCUMENTS

| DE | 25 28 113 A1 | 7/1976 |
|---|---|---|
| DE | 28 56 574 A1 | 7/1980 |
| DE | 34 27 479 A1 | 2/1986 |
| EP | 0 408 045 B1 | 1/1991 |
| EP | 0 512 372 A2 | 11/1992 |
| EP | 1240712 B1 | 8/2003 |

* cited by examiner

*Primary Examiner*—David Martin
*Assistant Examiner*—Tyrone Smith
(74) *Attorney, Agent, or Firm*—Harness, Dickey & Pierce, P.L.C.

(57) ABSTRACT

Asynchronous motors are controlled by way of two- or three-phase controllers that include at least two pair of thyristors connected in antiparallel and fired at certain intervals. According to the inventive method, a fundamental wave with the desired frequency is defined for the first phase and in the other phase a respective fundamental wave is defined that has the same frequency as that in the first phase, but phase-shifted by corresponding values. For every phase, firing intervals are marked that have the same polarity as the respective fundamental wave. Those intervals of the potential firing intervals are used for every phase at which there is a potential firing interval in one of the two other phases. These intervals are used as the actual firing intervals.

38 Claims, 7 Drawing Sheets

METHOD FOR OPERATING ASYNCHRONOUS MOTORS AND CORRESPONDING DEVICE

This application is the national phase under 35 U.S.C. § 371 of PCT International Application No. PCT/DE00/04444 which has an International filing date of Dec. 13, 2000, which designated the United States of America and which claims priority on German patent application number 199 62 667.7 filed Dec. 23, 1999, the entire contents of which are hereby incorporated by reference.

FIELD OF THE INVENTION

The invention generally relates to a method and an associated device for operating asynchronous motors. More preferably, it may relate to a method for finding triggering times of, for example, two- or three-phase, power controllers being connected to a three-phase network without connecting the star points of the stator winding of the asynchronous motor and which include at least two pairs of antiparallel-connected thyristors which are triggered at specific times.

BACKGROUND OF THE INVENTION

In various drive tasks, it is desired to operate an asynchronous motor with a rotational speed which is lower as compared with the nominal rotational speed and, in the process, to operate different directions of rotation, without changing the direction of rotation of the feeding network. For this purpose, conventional three-phase power controllers, such as electronic motor switch gear or soft starters, as they are known, can cost-effectively be provided with additional functionalities. Potential applications are, for example, in the positioning of transported goods or in electrically operated gates.

U.S. Pat. No. 4,791,341 A, U.S. Pat. No. 4,524,361 A and U.S. Pat. No. 4,461,985 A already disclose equipping a three-phase power controller with a total of five pairs of antiparallel thyristors. Using this, without changing the direction of rotation of the feeding network, a reversal of the direction of rotation of the connected asynchronous machine can be achieved. Furthermore, it is known from U.S. Pat. No. 4,481,456 A to use a total of nine pairs of antiparallel thyristors in such a way that each external conductor of the feeding network can be connected to each terminal of the three-phase asynchronous machine via a pair of the thyristors. With this arrangement, a matrix direct inverter, as it is known, is implemented.

In addition, EP 0 408 045 B1 and EP 0 512 372 A2 disclose a method and associated devices for motor control in which a pulse pattern is specified, with which fundamental waves can be produced at a frequency which corresponds to 1/(6n+1) of the main frequency of the feeding network, n being a natural number. Here, therefore, fundamental waves can be produced whose frequencies correspond to 1/7, 1/13, 1/19 etc., of the main frequency. However, an option to reverse the direction of rotation is not associated with this. Finally, DE 25 58 113 A1 already discloses the proposal of producing 1/(6n+1) of the mains frequency by means of specific pulses. Here, in order to reverse the direction of rotation, either two further pairs of antiparallel thyristors or mechanical changeover devices are needed.

SUMMARY OF THE INVENTION

It is an object of an embodiment of the invention to specify a method with which suitable triggering times for a three-phase power controller for operating an asynchronous motor. At the same time, without additional outlay on power-electronic components, in particular inverter valves, and additional switching elements, merely by use of a three-phase power controller having three or two pairs of antiparallel thyristors, an operation of an asynchronous machine with any desired fundamental waves can be produced. In particular, the fundamental wave is to correspond to 1/k the main frequency, k being a number $\geq 3$. Furthermore, at the same time any desired direction of rotation is to be possible.

In an embodiment of the invention, firstly, all the potentially possible triggering pulses are determined which result in the zero crossing of the concatenated voltage minus an angle $\phi$. For the triggering of the thyristor pair in the external conductor A, potential triggering pulses result, for example, when the phase angle of the feeding network is at the angle $\phi$ before the zero crossing of the concatenated voltage ($U_{AB}$) or of the concatenated voltage ($U_{CA}$). In this case, the angle $\phi$ has a magnitude preferably between 30 and 60°.

In the method according to an embodiment of the invention, firstly, for all three external conductors, the fundamental waves are defined which correspond to the desired rotational speed and direction of rotation of the motor. In particular in the case of a three-phase power controller which contains three pairs of antiparallel thyristors, only the potential triggering pulses in pairs are used. Therefore in each case two pairs of thyristors are triggered, whose resultant current flow has a polarity corresponding to the defined fundamental waves. In an entirely corresponding manner, in the case of a three-phase power controller which contains only two pairs of antiparallel thyristors, in which therefore thyristors are used only in two external conductors and the third external conductor is bridged, in addition those pairs of triggering pulses which cause a current flow only between the external conductors that are not bridged are ruled out. In this way, an uncontrollable current in the bridged external conductor whose polarity does not correspond to that of the defined fundamental wave is avoided.

In an embodiment of the invention, it is particularly advantageous that any desired rotational speeds with 1/k of the nominal rotational speed can be produced, k being a number $\geq 3$. It is also advantageous that merely by varying the angle $\phi$, the torque output at the frequency of the defined fundamental wave can be influenced.

The method described is implemented in particular by a software program. It can therefore be implemented simply in existing three-phase power controllers without additional expenditure on components.

BRIEF DESCRIPTION OF THE DRAWINGS

Further details and advantages of the invention emerge from the following figure description of an exemplary embodiment, using the drawings in conjunction with further subclaims.

In the drawings.

DETAILED DESCRIPTION OF THE PREFERRED EMBODIMENTS

Figure 1:
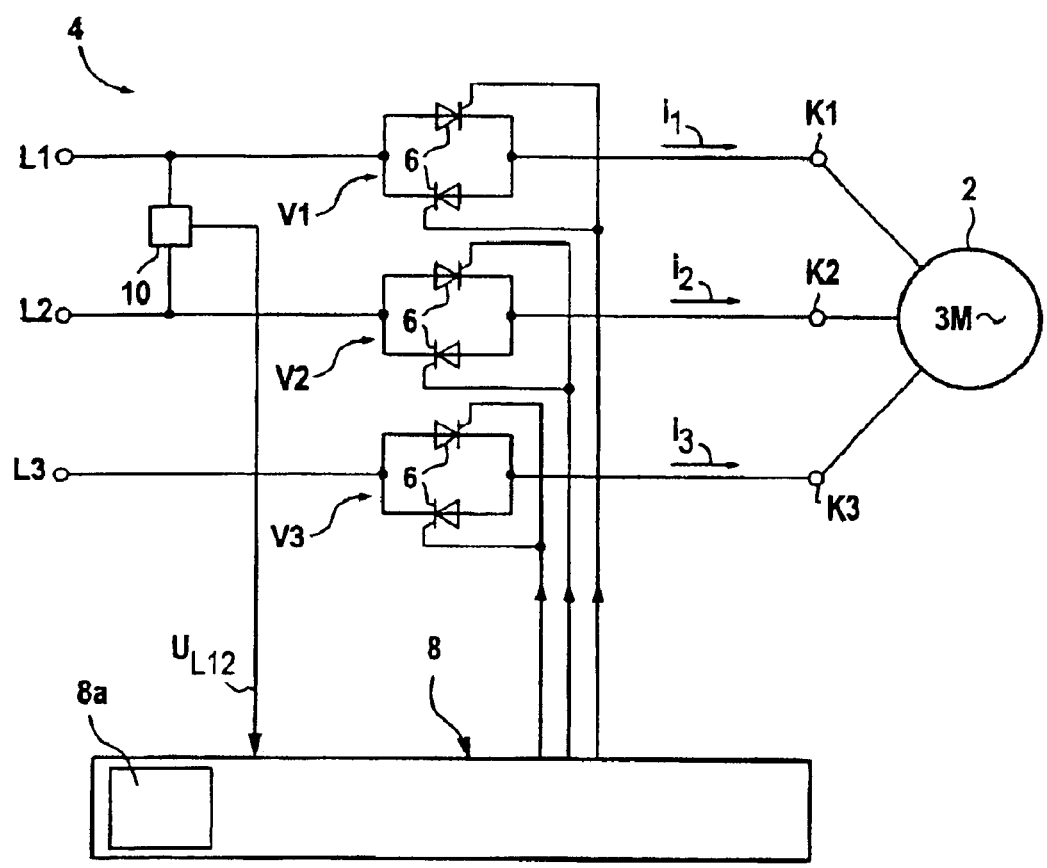
FIG. 1 shows a device for controlling an asynchronous motor with application of the method according to an embodiment of the invention.
Figure 5:
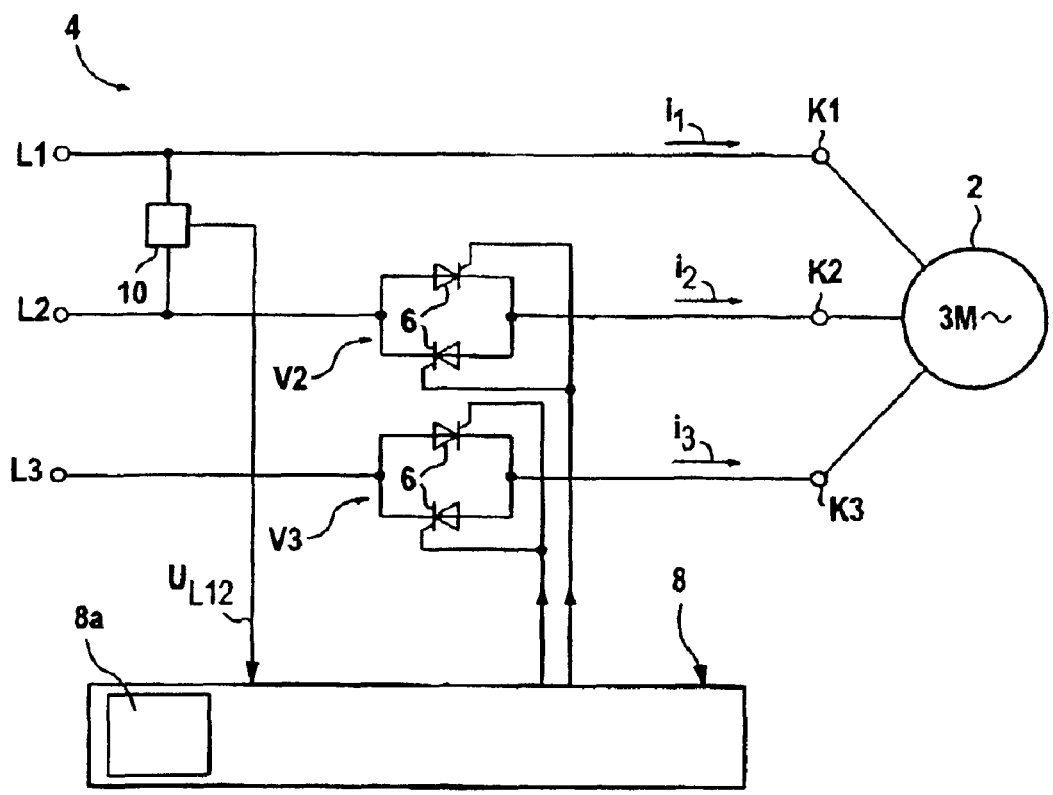
FIG. 5 shows a device corresponding to FIG. 1 specifically for the two-phase control of a motor.

In FIG. 1 and FIG. 5 in each case an induction machine 2, for example a three-phase asynchronous machine, is connected to the phases of the main via a three-phase alternating current power controller 4 as a three-phase power controller, as it is known. In FIG. 1, the main is the phases A, B and C of a three-phase network and, in FIG. 4, the phases A and B of a two-phase network.

Each of the phases is assigned a valve arrangement, for example in FIG. 1 each phase A, B and C is assigned a valve arrangement V1, V2, V3 and, in FIG. 5, the phases A and B are assigned a valve arrangement V1 and V2. The valve arrangements in each case include two antiparallel-connected thyristors 6. The triggering electrodes of the thyristors 6 are connected to a control device, with which the triggering signals required to trigger the thyristors 6 are provided in a predefined chronological sequence.

Between two external conductors of the network, for example between the terminals A and B of the network in FIG. 1, a voltage measuring device 10 is connected, at the output of which the main voltage $U_{AB}$ occurring between these two terminals A and B is available. Furthermore, there is a control device 8 for controlling the phase gate angle for the purpose of stopping the motor softly. A control device of such a type is preferably implemented by a microcontroller.

In the present case, the control device 8 is used to process a suitable program, with which the operation of the device can be carried out exclusively by means of software. In this case, the basis is a standardized method in which any desired parts of the nominal rotational speed (>=3) with any desired direction of rotation of the motor can be achieved for two- and three-phase soft starters. The control device can also be a microcontroller already provided for the motor.

Figure 2:
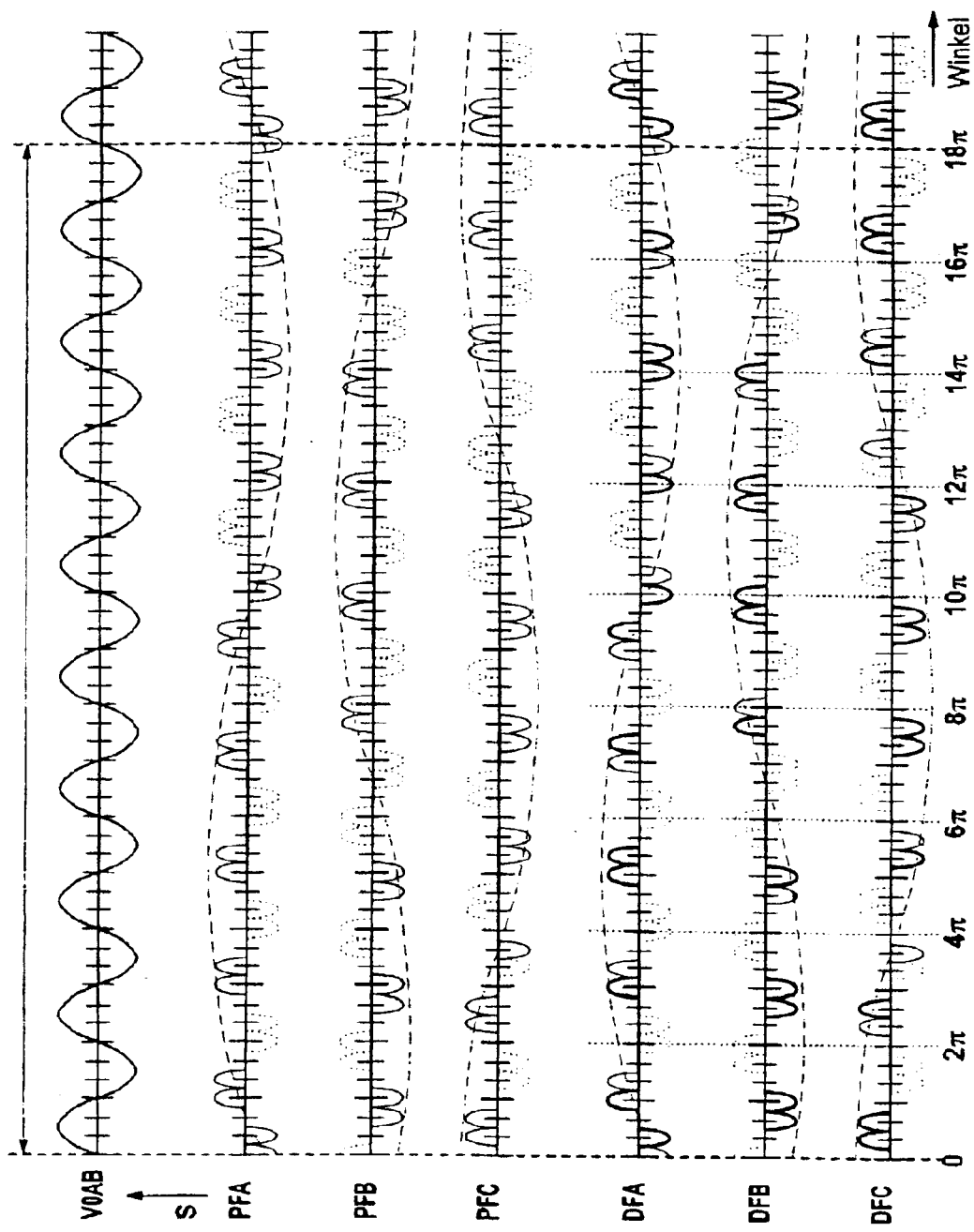
FIG. 2 shows graphs to illustrate the method in the case of a motor rotating clockwise.
Figure 4:
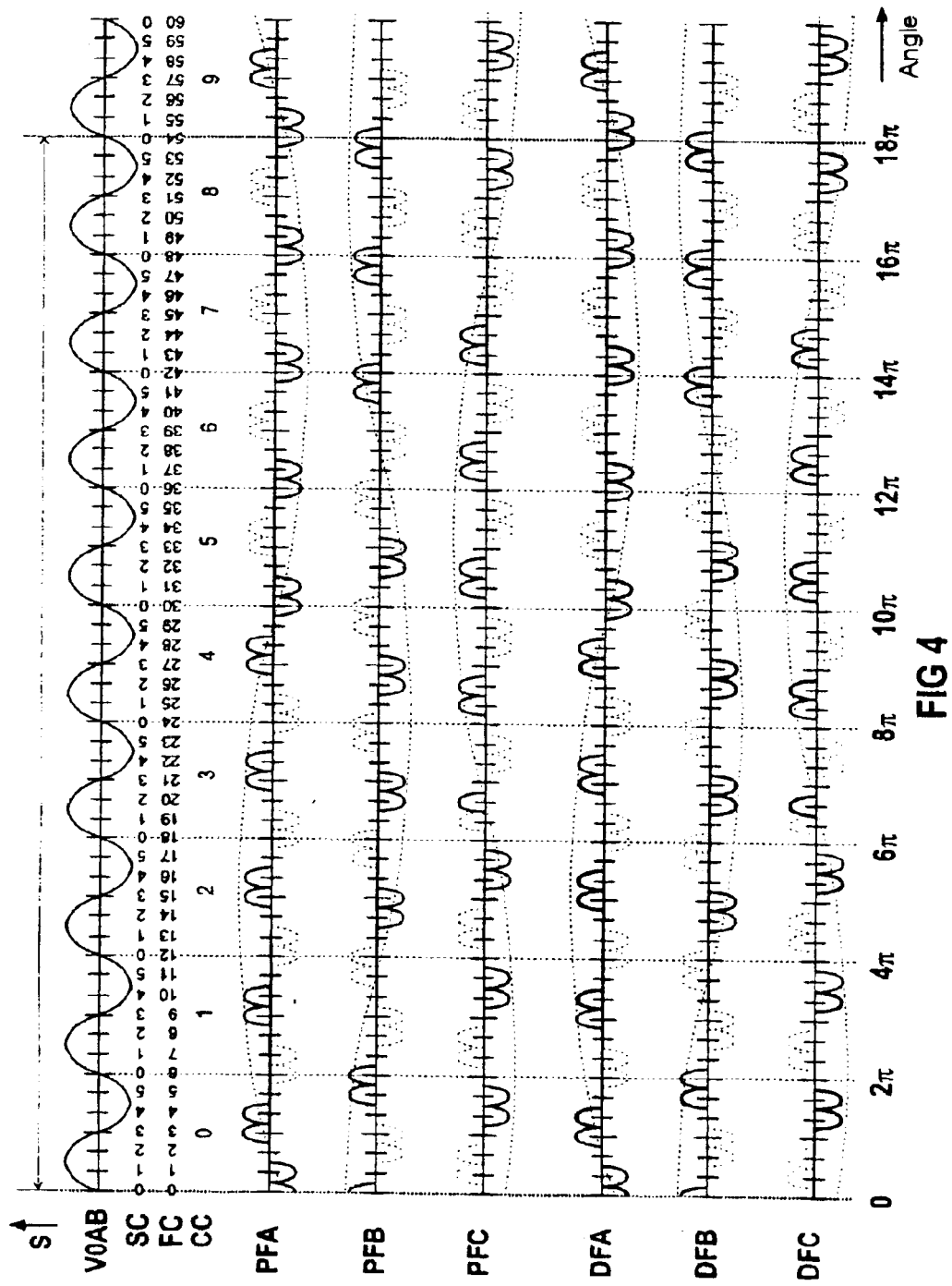
FIG. 4 shows a graph to illustrate the method in the case of a motor running counterclockwise.

In FIGS. 2 and 4, the individual signals s at a rotational speed of ⅑ of the nominal rotational speed are illustrated. In particular, FIG. 2 reproduces the situation in the case of a motor rotating clockwise and, in particular, FIG. 4 reproduces the situation in the case of a motor rotating counterclockwise.

In the graphical representations, the signals have the following meaning:

VAB=voltage of the phase A–B from FIG. 1. The signal is used as a reference for the calculated times for triggering the thyristors.

IA=current in the phase A in the event of triggering 30° before the zero crossing of the concatenated voltage.

Since a current must always flow in two phases, for each current pulse in one phase there is a current with opposite polarity in another phase, which are designated by IB and IC. The fundamental wave of the current at 1/k of the nominal rotational speed is designated by FA, FB and FC for the individual phases. In each case potential triggering times PFA, PFB and PFC can be derived from the fundamental wave. The final triggering times are designated by DFA, DFB and DFC.

To generate the triggering times, the following is done in individual steps: firstly, for the phase A, a fundamental wave at the desired frequency corresponding to 1/k of the final rotational speed of the motor is defined. In this case, the phase shift is unimportant. In the case of clockwise rotation, a fundamental wave is defined for the phase B which has the same frequency as that of the phase A but is time-delayed with respect to the latter by 120° —based on the divided frequency. For the phase C, the same is true as for the phase A, but here the shift is 240°.

In the second step, for each phase the triggering times whose associated current has the same polarity as that of the respective fundamental wave are marked. In the following step, from the potential triggering times for each phase, those are used at which there is a potential triggering time in one of the two other phases. These triggering times are used as the actual triggering times to operate the three-phase power controller.

Figure 3:
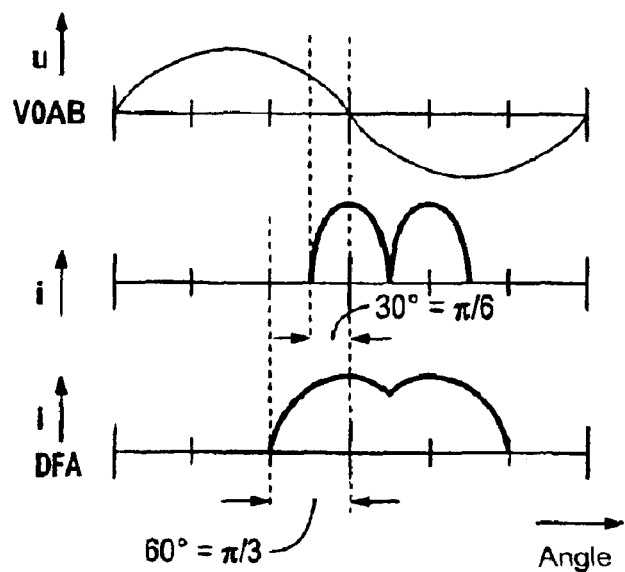
FIG. 3 shows a detail from FIG. 2 to illustrate the influence of the triggering angle.

FIG. 3 shows how the triggering angle φ determines the torque of the asynchronous motor. With any desired devisors of the nominal rotational speed, the triggering angle φ>0 can preferably be adjusted between 30° and 60°, which results in a torque that can be preset.

In order to achieve a rotational movement of the motor in the inverse direction, in accordance with the method described by using FIG. 2, the position of the fundamental waves of the external conductors B and C is interchanged. The selection and determination of the triggering times otherwise proceeds in a way identical to that in FIG. 2, which is reproduced by using FIG. 4.

In FIG. 5, a stator for a two-phase network having two pairs of antiparallel thyristors 6 is constructed, the third external conductor being permanently bridged. When the two thyristors pairs are driven, a current will also flow in this external conductor. For this reason, those triggering pulses which relate only to the two external conductors fitted with thyristors are removed.

Figure 6:
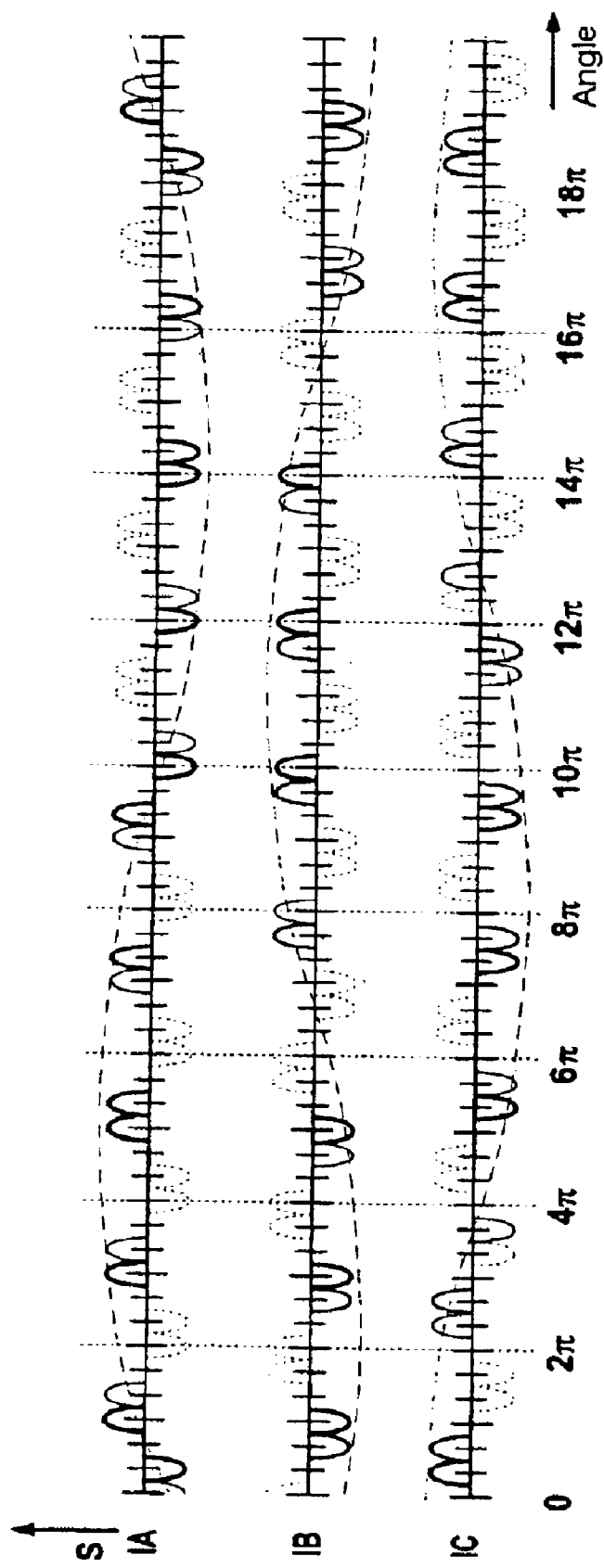
FIG. 6 shows a graph of the method with two pairs of antiparallel thyristors and FIG. 7 and FIG. 8 show flow diagrams for the determination by software of the triggering times for the individual phases.

The latter is illustrated by using FIG. 6, in which again ⅑ of the nominal rotational speed is assumed. For the case in which the phase A is bridged, the triggering pulses which relate only to the external conductors B and C are removed.

Using the control device 8 from FIG. 1 and FIG. 5, the respective thyristors are driven at suitable times in order to set a predefined rotational speed. For this purpose, the control device 8 comprises a computing unit, which in the following text is also designated by 8*a* and can be a microcontroller MC which is normally present in the case of an up-to-date three-phase power controller, for the purpose of determining the triggering times by means of software. Here, reference is made to the graph of FIG. 4, in which a complete period of nine individual periods is illustrated. There are counters SC, FC and CC, which count the individual times.

Each individual main period is subdivided into 60-degree sections. These are counted by the counter SC. The counter FC counts the 60-degree sections within one fundamental period. The counter CC is used to count the mains periods within one fundamental period. During each 60-degree section, 2 functions are used which calculate the polarity of the current in the respective phase and that of the fundamental wave.

The determination of the polarity of the current (function signOfCurrent) is illustrated in the following table:

|  | Result: −1 Sign negative 0 Zero 1 Sign positive | | | | | |
|---|---|---|---|---|---|---|
| CC | 0 | 1 | 2 | 3 | 4 | 5 |
| Phase | | | | | | |
| A | −1 | −1 | 0 | 1 | 1 | 0 |
| B | 1 | 0 | −1 | −1 | 0 | 1 |
| C | 0 | 1 | 0 | 0 | −1 | −1 |

Figure 7:
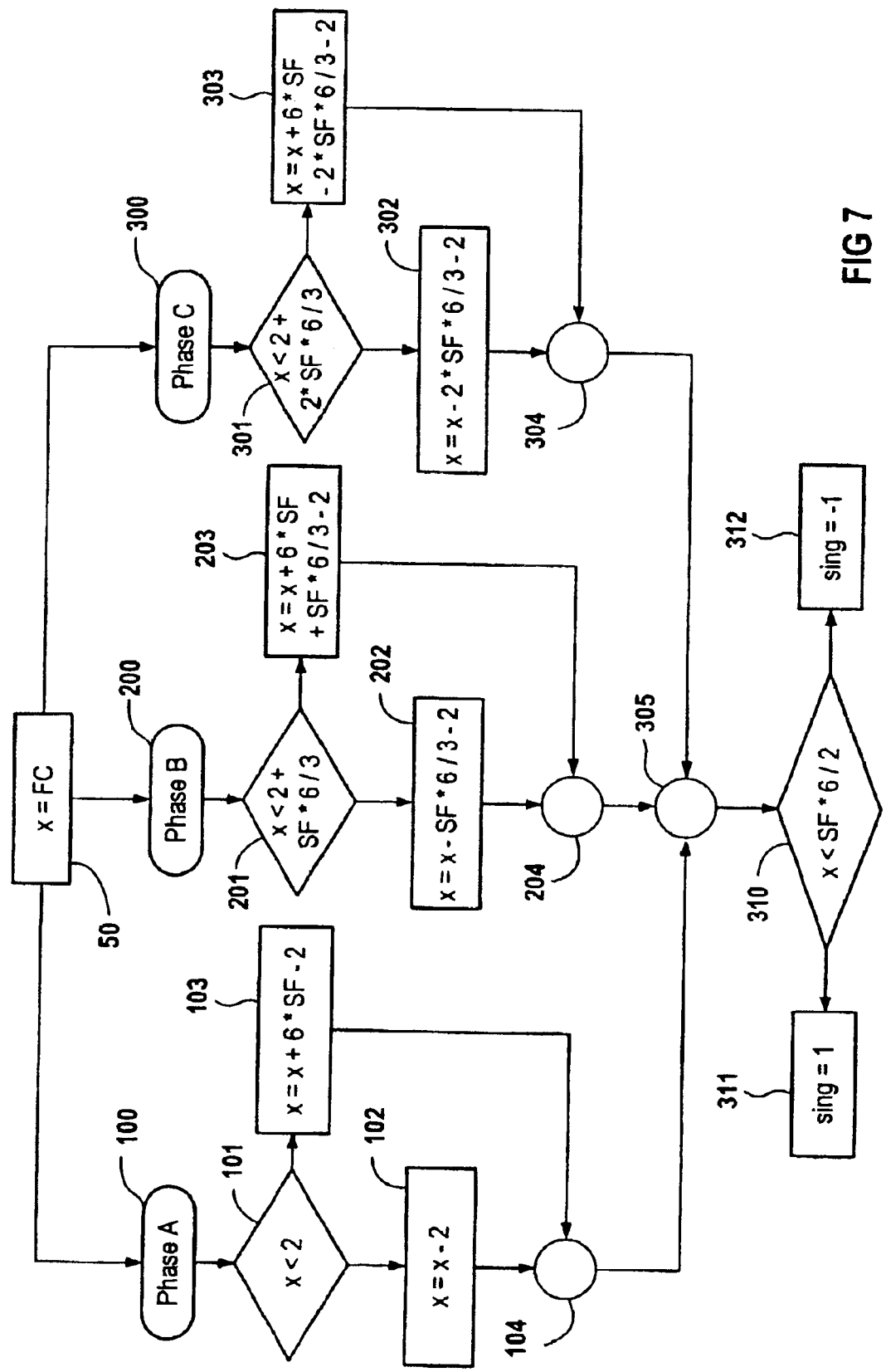

Using FIG. 7, the determination of the polarity of the fundamental wave is illustrated, a speed factor (Speedfactor)SF=9 being used: in position 50, a counter value x=FC is assumed which corresponds to 60° sections within a fundamental period. 100 designates the phase A, 200 the phase B and 300 the phase C. In the decision elements 101, 201 and 301, a check is made on the value of the variable x. If the value is satisfied, a corresponding value based on the output value FC is specified at the positions 102, 202 and 302. In the other case, a value increased by the speed 6×SF is output at the position 103, 203 and 303. In each case a corresponding shift takes place in the individual phases. In the positions 104, 204 and 304, the values are superimposed and the sum signal is passed onto the position at 305. At 310, a decision is made about the speed value and the polarity of the currents is output by using the sign.

For the triggering of the thyristors 6, the procedure is such that the above procedure is called every 60 degrees, based on VAB. The exact time of the call lies an adjustable time before the 60-degree mark. The magnitude of this time interval determines the power supplied to the motor and therefore the torque developed by the motor. By using CC, SC, and FC, a decision is made for each phase pair as to whether triggering is to take place in the respective phases.

Figure 8:
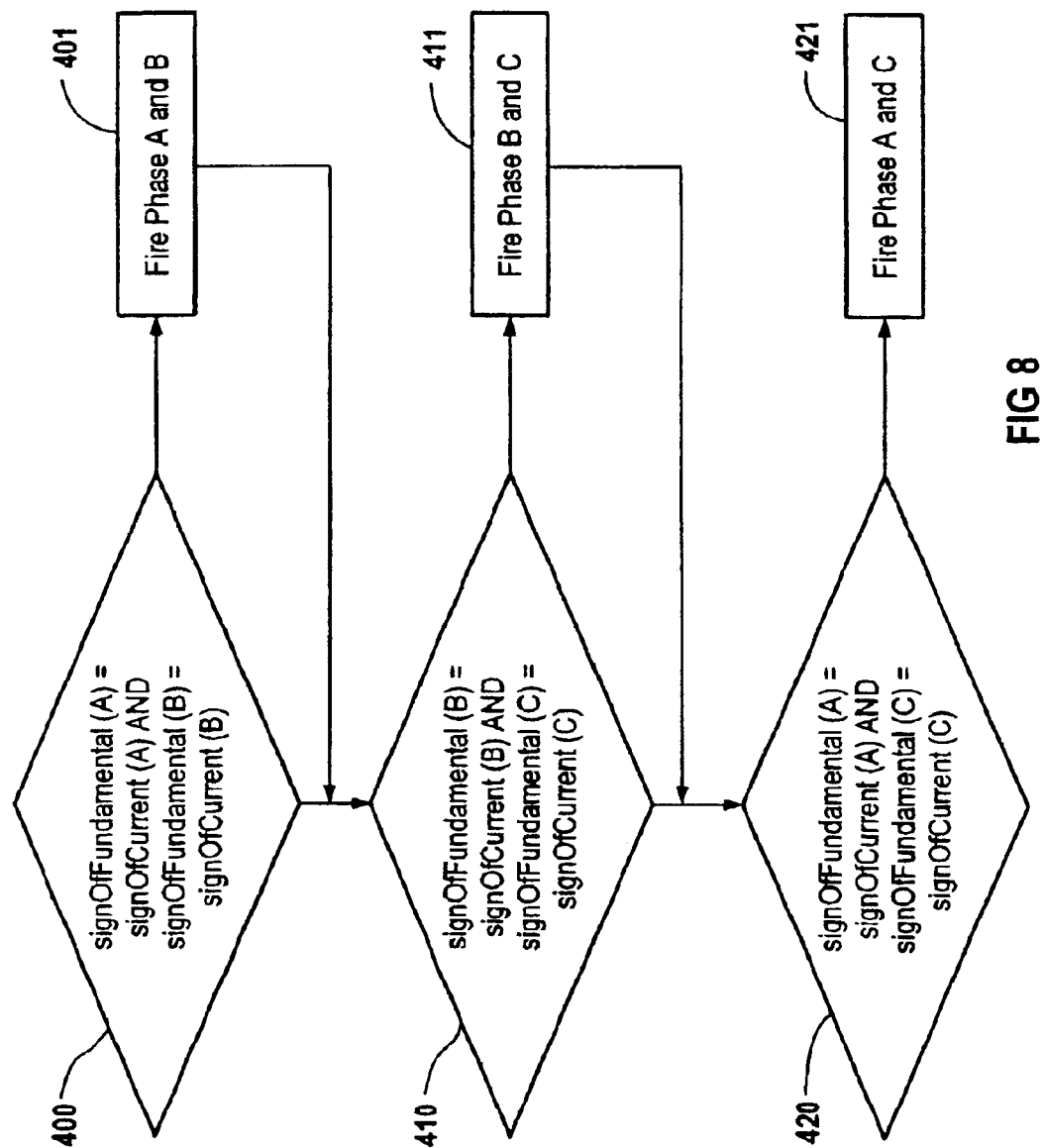

In FIG. 8, by using the decision diamonds, a decision is made on the basis of the signs of the individual phases as to which thyristors are to trigger. Position 400 relates to the phases A and B, position 410 relates to the phases B and C, and position 420 relates to the phases A and C. Depending on the sign determined using FIG. 7, in the positions 401, 411 and 421 in each case the signal for suitable triggering of the thyristors associated with the individual phases is provided.

In the examples according to the figures, it is assumed that the triggering lies 30° before the zero crossing of the respectively concatenated voltage. In order to increase the motor torque, the triggering can be advanced, a longer current flow time being achieved for each triggering. The triggering can preferably be carried out 30 to 60° before the zero crossing of the concatenated voltage.

The invention being thus described, it will be obvious that the same may be varied in many ways. Such variations are not to be regarded as a departure from the spirit and scope of the invention,and all such modifications as would be obvious to one skilled in the art are intended to be included within the scope of the following claims.

What is claimed is:

1. A method for determining triggering times of multi-phase power controllers for operating an asynchronous motor, the multi-phase power controllers being connected to a multi-phase network without connecting a start point of a stator winding of the asynchronous motor and the feeding network and including at least two pairs of antiparallel-connected thyristors, which are triggered at previously determinable times, comprising the following method steps:

defining, for the pairs of antiparallel thyristors, potential triggering pulses which lie at a specific triggering angle before a respective zero crossing of the main voltage;

defining a sinusoidal fundamental wave at a frequency which corresponds to the desired rotational speed of the asynchronous motor and whose frequency is lower than that of the main voltage;

defining two phase-shifted fundamental waves at the same frequency, the waves in each case being phase-shifted in relation to the defined sinusoidal fundamental wave;

rejecting, for each phase, previously marked potential triggering times which would cause a current of opposite polarity to that of the respectively associated fundamental wave; and selecting, of the remaining potential triggering times, those times for triggering each phase at which there is a triggering time in one of the two other phases, wherein the selected triggering times are usable as actual triggering times for the thyristors of the three-phase power controllers.

2. The method as claimed in claim 1, wherein, in the case of clockwise rotation, a fundamental wave is defined for the second phase which has the same frequency as the first phase, but which is time-delayed in relation to the latter by 120°, and for the third phase, a fundamental wave is defined which corresponds to that of the first phase, but which is time-delayed in relation to the latter by 240°.

3. The method as claimed in claim 1, wherein, in the case of counterclockwise rotation, a fundamental wave is defined for the second phase which has the same frequency as the first phase, but which is time-delayed in relation to the latter by 240° and, for the third phase, a fundamental wave is defined which corresponds to that of the first phase, but which is time-delayed in relation to the latter by 120°.

4. The method as claimed in claim 1, wherein the frequency of the fundamental wave is 1/k of the nominal rotational speed of the motor, where $k \geq 3$.

5. The method as claimed in claim 1, wherein any desired devisors of the nominal rotational speed with ($k \geq 3$) are generated with any desired direction of rotation of the motor.

6. The method as claimed in claim 1, wherein the torque, in the case of the arbitrary devisors $k \geq 3$ of the nominal rotational speed, is influenced by a triggering angle.

7. The method as claimed in claim 6, wherein the triggering angle lies between 30° and 60°.

8. The method as claimed in claim 1, wherein the generation of the fundamental waves and the selection of the triggering times are determined by a software program.

9. The method as claimed in claim 8, wherein the generation of the fundamental waves and the selection of the triggering point are carried out in a microcontroller in a controller of the asynchronous motor.

10. A device for determining triggering times of multi-phase power controllers for operating an asynchronous motor including a multi-phase power controller for the operational control of the asynchronous motor, and including at least two pairs of antiparallel-connected, respectively selectively triggerable thyristors, by using the method as claimed in claim 1, the device comprising:

a computing unit for the determination and selection of triggering times of the thyristors via software, the computing unit including, a plurality of counters for counting 60°-sections of fundamental waves belonging to the individual phases;

means for determining the polarity of the current at the times listed; and decision means for defining the triggering times for the individual thyristors.

11. The device as claimed in claim 10, wherein the computing unit is a microcontroller of the motor.

12. The device as claimed in claim 10, wherein the computing unit is part of a control device as a three-phase power controller.

13. The device as claimed in claim 12, wherein the computing unit sets up a program for determining the triggering times.

14. The device as claimed in claim 13, wherein the driving of the thyristors is carried out at the triggering times determined by the computing unit.

15. The method as claimed in claim 2, wherein the torque, in the case of the arbitrary devisors k≧3 of the nominal rotational speed, is influenced by a triggering angle.

16. The method as claimed in claim 15, wherein the triggering angle lies between 30° and 60°.

17. The method as claimed in claim 3, wherein the torque, in the case of the arbitrary devisors k≧3 of the nominal rotational speed, is influenced by a triggering angle.

18. The method as claimed in claim 17, wherein the triggering angle lies between 30° and 60°.

19. The method as claimed in claim 4, wherein the torque, in the case of the arbitrary devisors k≧3 of the nominal rotational speed, is influenced by a triggering angle.

20. The method as claimed in claim 19, wherein the triggering angle lies between 30° and 60°.

21. The method as claimed in claim 5, wherein the torque, in the case of the arbitrary devisors k≧3 of the nominal rotational speed, is influenced by a triggering angle.

22. The method as claimed in claim 21, wherein the triggering angle lies between 30° and 60°.

23. A method for determining triggering times of multi-phase power controllers for operating an asynchronous motor as claimed in claim 1, wherein the triggering times are for starting and stopping the asynchronous motor.

24. A device for determining triggering times of multi-phase power controllers for operating an asynchronous motor including a multi-phase power controller for the operational control of the asynchronous motor, and including at least two pairs of antiparallel-connected, respectively selectively triggerable thyristors, by using the method as claimed in claim 2, the device comprising:
   a computing unit for the determination and selection of triggering times of the thyristors via software, the computing unit including,
      a plurality of counters for counting 60°-sections of fundamental waves belonging to the individual phases;
      means for determining the polarity of the current at the times listed; and
      decision means for defining the triggering times for the individual thyristors.

25. The device as claimed in claim 24, wherein the computing unit is a microcontroller of the motor.

26. The device as claimed in claim 24, wherein the computing unit is part of a control device as a three-phase power controller.

27. A device for determining triggering times of multi-phase power controllers for operating an asynchronous motor including a multi-phase power controller for the operational control of the asynchronous motor, and including at least two pairs of antiparallel-connected, respectively selectively triggerable thyristors, by using the method as claimed in claim 3 , the device comprising:
   a computing unit for the determination and selection of triggering times of the thyristors via software, the computing unit including,
   a plurality of counters for counting 60°-sections of fundamental waves belonging to the individual phases;
   means for determining the polarity of the current at the times listed; and
   decision means for defining the triggering times for the individual thyristors.

28. The device as claimed in claim 27, wherein the computing unit is a microcontroller of the motor.

29. The device as claimed in claim 27, wherein the computing unit is part of a control device as a three-phase power controller.

30. A device for determining triggering times of multi-phase power controllers for operating an asynchronous motor including a multi-phase power controller for the operational control of the asynchronous motor, and including at least two pairs of antiparallel-connected, respectively selectively triggerable thyristors, the device comprising:
   means for defining, for the pairs of antiparallel thyristors, potential triggering pulses which lie at a specific triggering angle before a respective zero crossing of the main voltage;
   means for defining a sinusoidal fundamental wave at a frequency which corresponds to the desired rotational speed of the asynchronous motor and whose frequency is lower than that of the main voltage;
   means for defining two further phase-shifted fundamental waves at the same frequency, the waves in each case being phase-shifted in relation to the defined sinusoidal fundamental wave;
   means for rejecting, for each phase, previously marked potential triggering times which would cause a current of opposite polarity to that of the respectively associated fundamental wave; and
   means for selecting, of the remaining potential triggering times, those times for triggering each phase at which there is a triggering time in one of the two other phases, wherein the selected triggering times are usable as actual triggering times for the thyristors of the three-phase power controllers.

31. The device as claimed in claim 30, wherein, in the case of clockwise rotation, a fundamental wave is defined for the second phase which has the same frequency as the first phase, but which is time-delayed in relation to the latter by 120°, and for the third phase, a fundamental wave is defined which corresponds to that of the first phase, but which is time-delayed in relation to the latter by 240°.

32. The device as claimed in claim 30, wherein, in the case of counterclockwise rotation, a fundamental wave is defined for the second phase which has the same frequency as the first phase, but which is time-delayed in relation to the latter by 240° and, for the third phase, a fundamental wave is defined which corresponds to that of the first phase, but which is time-delayed in relation to the latter by 120°.

33. The device as claimed in claim 30, wherein the frequency of the fundamental wave is 1/k of the nominal rotational speed of the motor, where k≧3.

34. The device as claimed in claim 30, wherein any desired devisors of the nominal rotational speed with (k≧3) are generated with any desired direction of rotation of the motor.

35. The device as claimed in claim 30, wherein the torque, in the case of the arbitrary devisors k≧3 of the nominal rotational speed, is influenced by a triggering angle.

36. The device as claimed in claim 35, wherein the triggering angle lies between 30° and 60°.

37. The device as claimed in claim 30, wherein the generation of the fundamental waves and the selection of the triggering times are determined by a software program.

38. The device as claimed in claim 37, wherein the generation of the fundamental waves and the selection of the triggering point are carried out in a microcontroller in a controller of the asynchronous motor.

* * * * *